United States Patent
Drago

(10) Patent No.: US 10,399,720 B2
(45) Date of Patent: Sep. 3, 2019

(54) VACUUM SEALING VALVE FOR CANNING JAR LIDS

(71) Applicant: James M. Drago, Sweet Home, OR (US)

(72) Inventor: James M. Drago, Sweet Home, OR (US)

( * ) Notice: Subject to any disclaimer, the term of this patent is extended or adjusted under 35 U.S.C. 154(b) by 118 days.

(21) Appl. No.: 15/731,321

(22) Filed: May 22, 2017

(65) Prior Publication Data

US 2018/0334277 A1    Nov. 22, 2018

(51) Int. Cl.
*F16K 15/14*   (2006.01)
*B65B 31/04*   (2006.01)
*B65D 81/20*   (2006.01)

(52) U.S. Cl.
CPC ........... *B65B 31/04* (2013.01); *B65B 31/047* (2013.01); *B65D 81/2038* (2013.01); *F16K 15/148* (2013.01)

(58) Field of Classification Search
CPC ..... B65D 81/2038; B65D 81/203; F16K 7/16; B65B 31/047
USPC .................................................. 137/526, 854
See application file for complete search history.

(56) References Cited

U.S. PATENT DOCUMENTS

| | | | |
|---|---|---|---|
| 7,140,402 B2 | 6/2006 | Russell | |
| 8,607,832 B2 | 12/2013 | Ferlito et al. | |
| 8,967,413 B2 | 3/2015 | Tinstman et al. | |
| 2005/0211319 A1* | 9/2005 | Kobetsky | B65D 77/225 137/854 |
| 2006/0131339 A1* | 6/2006 | Anderson | B65D 81/2038 222/212 |
| 2007/0265587 A1* | 11/2007 | Chen | B65D 81/2038 604/319 |
| 2011/0247299 A1 | 10/2011 | Scott | |

* cited by examiner

*Primary Examiner* — P. Macade Nichols

(57) ABSTRACT

A resealable vacuum valve for sealing a canning jar has an annular vacuum interface ring, a vacuum interface ring surface, and a valve interface bottom surface opposite the vacuum interface ring surface. A sealing membrane is interior to the vacuum interface ring.

An anchor stem is fixedly attached to and extending from the bottom of the sealing membrane. At least one air evacuation hole is disposed through the sealing membrane interior to and equidistantly around the interior of the vacuum interface ring.

With the anchor stem of the vacuum valve extended through a hole disposed in a lid placed onto a canning jar, a vacuum is applied to the vacuum valve removing air from inside the canning jar through the air evacuation holes such that the vacuum seals the sealing membrane bottom surface to the canning jar lid while sealing the canning jar lid to the canning jar.

10 Claims, 4 Drawing Sheets

VACUUM SEALING VALVE FOR CANNING JAR LIDS

BACKGROUND OF THE INVENTION

Field of the Invention

The present invention generally relates to the technology of vacuum packaging of foods. More particularly, the present invention relates to the vacuum packaging of perishable foods or similar products in containers provided with a sealing closure lid such as a standard canning jar lid.

It is well known that food storage can be improved by keeping food in a container under vacuum. Keeping food in a container under vacuum prevents the food from spoiling or becoming stale as quickly as the food normally would under normal pressure.

Canning is a well-known, common method of preserving food which entails preparing the food, putting the food in a sterilized glass canning jar, placing a canning lid commonly having a sorbitol sealing ring along the outer edge atop the jar, loosely screwing a ring onto the canning jar thereby holding the canning lid in place, and finally, boiling the jar in water thereby heating and reducing the volume of air inside the jar such that the lid seals to the top of the jar. One can tell that the jar is sealed when the center of the lid becomes sucked toward the interior of the jar. Typically, a canning jar is opened by removing the ring and prying the lid from the jar. Once the jar has been opened, the lid is often deformed and will not likely be sealable again.

There are many devices currently on the market to reseal a canning jar with a new lid having a sealing device or mechanism. One such device is the Pump-N-Seal® by Pioneer Concepts. This product comes with a pin (looks like a cork board push pin) to punch a hole in the center of a standard canning jar lid, several sealing tabs, and a hand pump vacuum device. The sealing tabs have a center sealing section and adhesive tabs on either side to adhere the tab to the jar lid. The punched hole is covered with the sealing section. The vacuum device is centered over the tab and the user manually pumps the vacuum device to evacuate the air from the jar.

Unfortunately, the tabs for this product are not reusable and will require further purchases. Also, since the punched hole is so small, it is difficult to tell for sure that the jar is sealed. Additionally, in the absence of some type of datum, it is left to the user to center the sealing section of the tab over the hole to get an optimal seal. One can imagine that a jar of food inadvertently unsealed from the atmosphere is likely to spoil more quickly and may become a consumption risk.

Another product currently on the market is the Food Saver® Jar Sealer. This product covers the entire canning jar lid and has an attachment that goes to the Food Saver® countertop electric vacuum seal device for removing the air from the jar. This device does not punch a hole in the lid to accommodate an after-market valve for sealing but requires a new canning jar lid each time sealing is required since prying the lid off deforms the lid. Additionally, a different device is required for wide mouth lids and regular mouth lids. The Food Saver® Jar Sealer is complicated, costly, and requires a considerable amount of counter space to operate effectively.

Another product currently on the market and pending a patent is the ThriftyVac® Mason Jar lids. This product has pre-installed valves in typical canning jar lids. It utilizes a special hand pump or can be used with an electric pump such as the Food Saver® pump with the purchase of a hosed adapter. The valve on the ThriftyVac® product is a two-part plastic valve that is quickly fouled when fine particles get lodged within the valve. The valve must be disassembled to remove the obstruction. The on-line reviews of the Thrift-Vac® Mason Jar Lids suggest that after extended use the plastic valve becomes loose and unusable, there is no visible indication that the jar is sealed, and that the valve extends above the lid such that the jars are not stackable. Additionally, hard plastics tend to get brittle after freezing and thawing multiple times.

U.S. Pat. No. 8,607,832 issued to Ferlito, discloses a single device for punching, applying a valve, and a hand pump for sealing a canning jar. The Ferlito sealing valve is a combination of hard plastic for rigidity and a soft rubber material with ridges for sealing. The primary advantage of the Ferlito device is that it is all contained in one assembly. However, if the hand pump fails, a new assembly must be purchased. Ferlito does not disclose or suggest the adaptation to an alternate pump. Additionally, the valves are not reusable as Ferlito discloses (col. 7, lines 24-29) " . . . by virtue of the achievement of the punching member in plastic material, unlike a metal punching tip, after the impact with the sheet metal of the lid and its piercing, the tip of the member is blunted, so that it is not dangerous if a user should inadvertently touch the inner face of the lid . . . " making it clear that the valve is not intended to or capable of punching a second time.

U.S. Pat. No. 7,140,402 issued to Russell, discloses a multifunctional tool that punches, applies a valve or seal, and extracts the air from the jar. The Russell valve requires a PST (pressure sensitive tape) or other adhesive to initially attach the valve to the jar from which the air is removed. The use of a tape or adhesive makes the valve single-use. Russell is a complicated system that would be expensive to manufacture. The valve would not be functional as a stand-alone valve, nor would it work with any of the existing vacuum devices—hand or electrical pumps.

Although there are several products currently on the market for vacuum sealing a container or canning jar, there is a need for a sealing product that is: simple in construction and inexpensive to produce; reusable; has a clearly visible seal status, i.e., sealed or not sealed; has vacuum ports not in contact with the product in the jar eliminating potential fouling of the vacuum process; freezable while maintaining its shape and pliable characteristics; and of a low profile allowing jars to be stacked without potentially compromising the vacuum seal.

SUMMARY OF THE INVENTION

A resealable vacuum valve for sealing a canning jar, comprising has an annular vacuum interface ring having an interior wall, a vacuum interface ring surface, and a valve interface bottom surface opposite the vacuum interface ring surface. A sealing membrane is interior to the vacuum interface ring.

There is an anchor stem fixedly attached to, essentially centered on, and extending from the bottom of the sealing membrane. At least one air evacuation hole is disposed through the sealing membrane interior to and equidistantly around the interior wall of the vacuum interface ring.

With the anchor stem of the resealable vacuum valve extended through a hole disposed near the center of a canning jar lid placed onto a canning jar, a vacuum is applied to the resealable vacuum valve removing air from inside the canning jar through the air evacuation holes such that the vacuum seals the sealing membrane bottom surface to the canning jar lid while sealing the canning jar lid to the canning jar.

BRIEF DESCRIPTION OF THE DRAWINGS

Further characteristics and advantages of the invention will be set forth in more detail in the following detailed description given as non-limiting examples with reference to the attached drawings, in which.

DRAWING—REFERENCE NUMBERS

102 Resealable Vacuum Valve
104 Canning Jar Lid
202 Anchor Stem
204 Valve Retaining Anchor
206 Lid Port
208 Sealing Membrane
302 Vacuum Interface Ring Surface
304 Sealing Membrane Top Surface
306 Air Evacuation Holes
308 Vacuum Dimple
310 Interior Wall
402 Valve Interface Bottom Surface
404 Sealing Membrane Bottom Surface
502 Valve Width
602 Canning Jar Ring
604 Canning Jar
606 Electric Vacuum Sealer
608 Vacuum Sealer Nose
610 Electrical Connection
702 Alternate Resealable Vacuum Valve
802 Second Alternate Resealable Vacuum Valve

DETAILED DISCUSSION OF THE PREFERRED EMBODIMENTS

Figure 1:
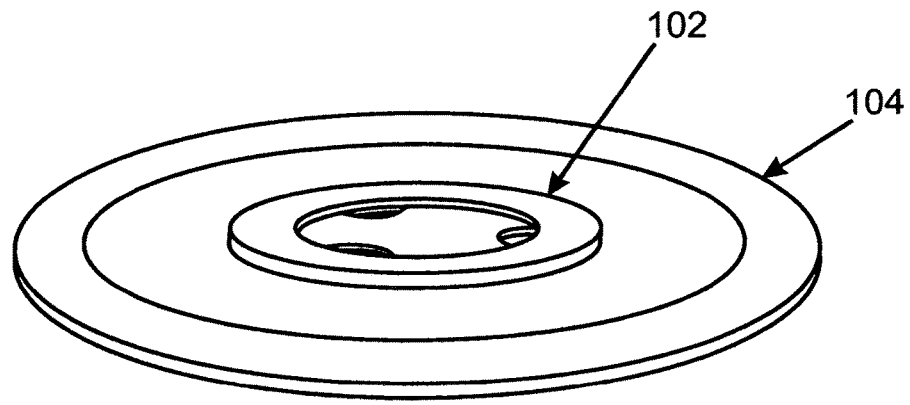
FIG. 1 is a perspective view of the resealable vacuum valve of the present invention placed atop a standard canning jar lid.

FIG. 1 is a perspective view of Resealable Vacuum Valve 102 of the present invention placed atop Canning Jar Lid 104. As shown, Resealable Vacuum Valve 102 is centered on Canning Jar Lid 104. Resealable Vacuum Valve 102 is constructed from a pliable rubber or silicone material. Silicone is the preferred material as it retains its pliability after cleaning, heating, and freezing. Resealable Vacuum Valve 102 can be constructed by compression molding, injection molding, or other processes that form silicone or pliable rubber.

Figure 2:
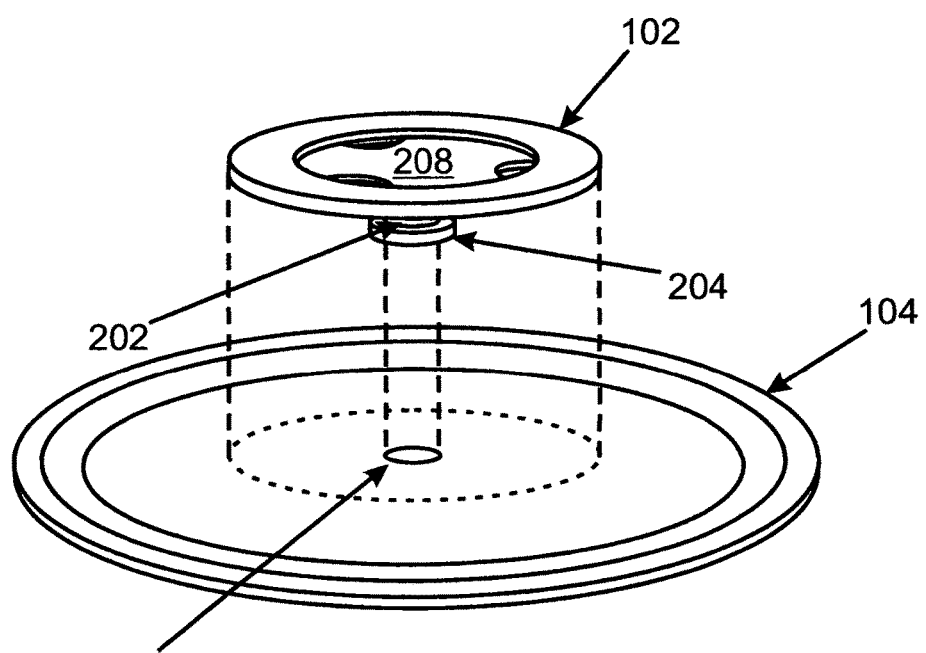
FIG. 2 is an exploded view of the resealable vacuum valve of the present invention and a standard canning jar lid.

FIG. 2 is an exploded view of Resealable Vacuum Valve 102 of the present invention and a Canning Jar Lid 104. The center portion of Resealable Vacuum Valve 202 is Sealing Membrane 208. Extending centered and below Sealing Membrane 208 is Anchor Stem 202 having Valve Retaining Anchor 204 at its distal end which is slightly larger in diameter that Anchor Stem 202. Canning Jar Lid 104 is shown with Lid Port 206 disposed essentially centered through the thickness of Canning Jar Lid 104. The diameter of Lid Port 206 is slightly smaller than Valve Retaining Anchor 204 and slightly larger than the diameter of Anchor Stem 202, such that Valve Retaining Anchor 204 is easily pressed into Lid Port 206. With Anchor Stem 202 extending through Canning Jar Lid 104 and Valve Retaining Anchor 204 being slightly larger than Lid Port 206, Resealable Vacuum Valve 102 remains centered and in place during the sealing process. To separate Resealable Vacuum Valve 102 from Canning Jar Lid 104, the user simply picks it up with minimal force thereby pulling Valve Retaining Anchor 204 back through Lid Port 206.

Figure 3:
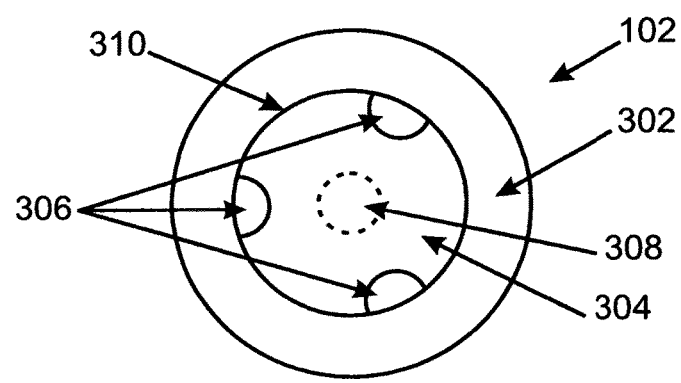
FIG. 3 is a top view of the resealable vacuum valve of the present invention.

FIG. 3 is a top view of Resealable Vacuum Valve 102 of the present invention. As shown, Resealable Vacuum Valve 102 has Vacuum Interface Ring Surface 302 around its perimeter and Sealing Membrane Top Surface 304 of Sealing Membrane 208 interior to Vacuum Interface Ring Surface 302. The thickness of Sealing Membrane 208 is approximately half the thickness of Vacuum Interface Ring Surface 302 creating Interior Wall 310 that is perpendicular to Sealing Membrane Top Surface 304. Sealing Membrane 208 must be thin enough to be raised by even a weak vacuum while being thick enough to maintain its shape and not easily tear. In the preferred embodiment, Sealing Membrane 208 is approximately $\frac{1}{32}$ thick while Vacuum Interface Ring Surface 302 is approximately $\frac{1}{16}$" thick. Air Evacuation Holes 306 are disposed through Sealing Membrane Top Surface 304 interior to Vacuum Interface Ring Surface 302. Three Air Evacuation Holes 306 is preferred, but it has been contemplated to have one or more Air Vacuum Holes 306 disposed equidistant from one another around the interior of Vacuum Interface Ring Surface 302. Vacuum Dimple 308 is shown in phantom. When Resealable Vacuum Valve 102 is in a sealed state, Vacuum Dimple 308 is recessed below Sealing Membrane Top Surface 304 as vacuum is applied to Resealable Vacuum Valve 102 pulling Anchor Stem 202 (not shown) into the canning jar (not shown) giving the user a clear indication that the jar lid (not shown) is sealed atop the canning jar (not shown). If the canning jar is not adequately sealed, Vacuum Dimple 308 will not be visible as it will be planar with Sealing Membrane Top Surface 304.

Figure 4:
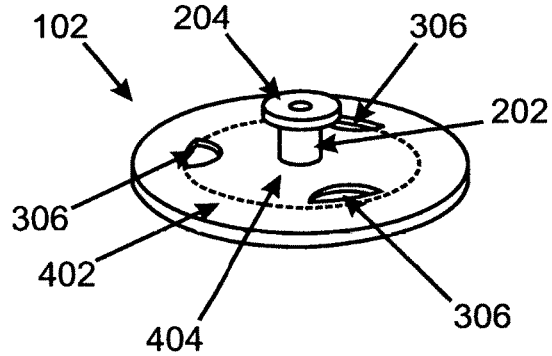
FIG. 4 is a bottom perspective view of the resealable vacuum valve of the present invention.

FIG. 4 is a bottom perspective view of Resealable Vacuum Valve 102 of the present invention. As shown, Resealable Vacuum Valve 102 has Anchor Stem 202 fixedly attached and extending from Sealing Membrane Bottom Surface 404. Valve Interface Bottom Surface 402 is opposite Vacuum Interface Ring Surface 302 and is planar with Sealing Membrane Bottom Surface 404.

Figure 5:
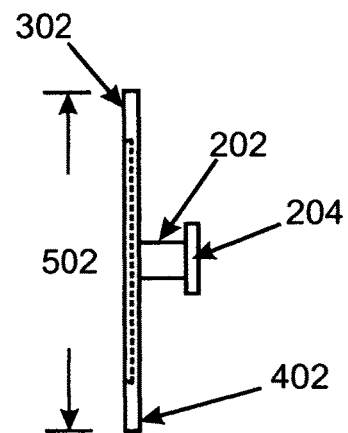
FIG. 5 is a side view of the resealable vacuum valve of the present invention.

FIG. 5 is a side view of Resealable Vacuum Valve 102 of the present invention. In the preferred embodiment, Valve Width 502 is approximately $1\frac{3}{8}$ inches. However, the width can be varied slightly as long as Valve Interface Bottom Surface 402 is approximately the size of a standard vacuum sealer. One such vacuum sealer is the FreshSaver™ by FoodSaver®. For clarity, Sealing Membrane Top Surface 304 is shown in phantom. As previously discussed, it is slightly recessed below Vacuum Interface Ring Surface 302 while Sealing Membrane Bottom Surface 404 is essentially planar Valve Interface Bottom Surface 402.

Figure 6:
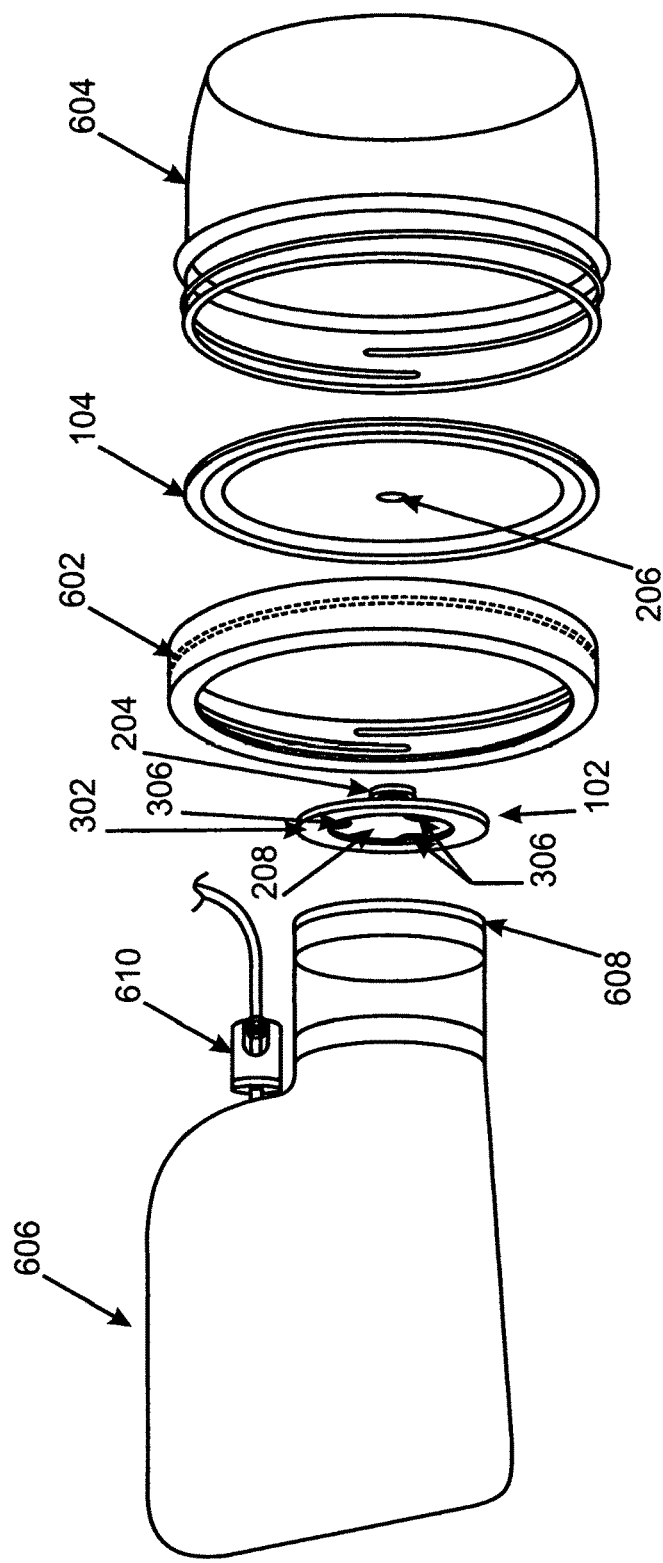
FIG. 6 is an exploded view of the components of a sealing process using the resealable vacuum valve of the present invention.

FIG. 6 is an exploded view of the components of a sealing process using Resealable Vacuum Valve 102 of the present invention. Canning Jar 604 is shown at the far right. There are two standard sized canning jars currently on the market, and either size is compatible with the present invention. Canning Jar Lid 104 has Lid Port 206 disposed near its center and is placed atop Canning Jar 604. Canning Jar Ring 602 is placed atop Canning Jar Lid 104 and screwed firmly onto Canning Jar 604. Resealable Vacuum Valve 102 is placed onto Canning Jar Lid 104 with Valve Retaining Anchor 204 extending through Lid Port 206 into Canning Jar 604. Electric Vacuum Sealer 606 is shown having Electric Cord 610 and Vacuum Sealer Nose 608. To seal the jar, Vacuum Sealer Nose 608 is placed against Vacuum Interface Ring Surface 302. With Electric Vacuum Sealer 606 turned on, vacuum is applied to Resealable Vacuum Valve 102 and air is removed from Canning Jar 604 through Air Evacuation Holes 306. Sealing Membrane Bottom Surface 404 (not shown) of Sealing Membrane 208 is held onto Canning Jar Lid 104 by the applied vacuum. To remove or unseal Canning Jar 604, the user simply lifts the edge of Resealable Vacuum Valve 102 and the vacuum pressure is released. As previously discussed, Valve Retaining Anchor 204 is slightly larger in circumference than Lid Port 206 allowing Canning Jar Lid 104 and Resealable Vacuum Valve 102 to stay loosely together until the user wishes to reseal the canning jar.

Figure 7:
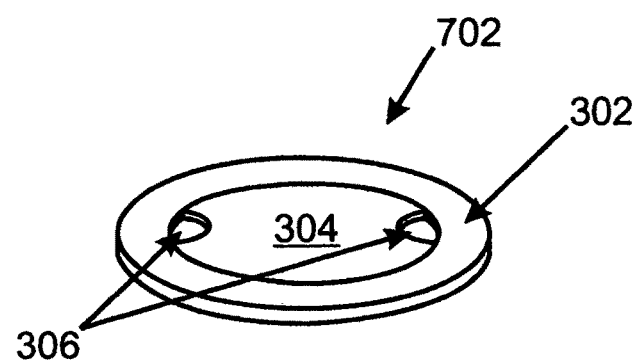
FIG. 7 is a perspective view of an alternate embodiment of the resealable vacuum valve of the present invention.

FIG. 7 is a perspective view of Alternate Resealable Vacuum Valve 702 of the present invention. In this alternate embodiment, there are two Air Evacuation Holes 306. As previously discussed, they are distributed equidistantly around the interior of Vacuum Interface Ring Surface 302 and disposed through Sealing Membrane 304. Although the preferred embodiment includes Anchor Stem 202 with Valve Retaining Anchor 204, Alternate Resealable Vacuum Valve 702, for simplicity, does not. The user simply places Alternate Resealable Vacuum Valve 702 somewhat centered over Lid Port 206 (not shown) of Canning Jar Lid 104 (not shown).

Figure 8:
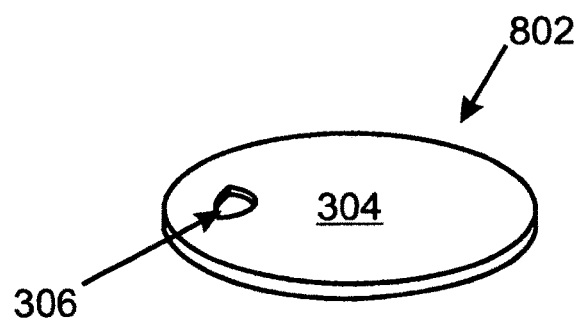
FIG. 8 is a perspective view of a second alternate embodiment of the resealable vacuum valve of the present invention.

FIG. 8 is a perspective view of Second Alternate Resealable Vacuum Valve 802 of the present invention. Second Alternate Resealable Vacuum Valve 802 has only Sealing Membrane 304 and one Air Evacuation Holes 306. This embodiment has been shown to work well in the absence of Anchor Stem 202 and Vacuum Interface Ring Surface 302 as disclosed in the preferred embodiment of Resealable Vacuum Valve 102. However, it requires the user to be more mindful of centering Second Alternate Resealable Vacuum Valve 802 over Lid Port 206 (not shown) of Canning Jar Lid 104 (not shown). Additionally, it is critical that Air Evacuation Holes 306 does not intersect with Lid Port 206 (not shown) in order to seal and maintain a seal.

I claim:

1. A resealable vacuum valve for sealing a canning jar, comprising:
    a sealing membrane interior to a vacuum interface ring having a sealing membrane top surface and a sealing membrane bottom surface opposite the sealing membrane top surface; and
    at least one air evacuation holes disposed through and interior to the sealing membrane,
    wherein, the resealable vacuum valve is placed essentially centered on a hole disposed near the center of a canning jar lid placed onto a canning jar, a vacuum is applied to the resealable vacuum valve removing air from inside the canning jar through the air evacuation holes such that the vacuum seals the sealing membrane bottom surface to the canning jar lid while sealing the canning jar lid to the canning jar.

2. The resealable Vacuum Valve of claim 1, further comprising:
    the vacuum interface ring is annular having an interior wall, a vacuum interface ring surface, and a valve interface bottom surface opposite the vacuum interface ring surface.

3. The resealable Vacuum Valve of claim 1, further comprising:
    an anchor stem structurally attached to, essentially centered on, and extending from the sealing membrane bottom surface.

4. The resealable vacuum valve of claim 3, further comprising, the anchor stem having a valve retaining anchor at a distal end slightly larger in circumference than the anchor stem.

5. The resealable Vacuum Valve of claim 1 is made of a single piece of silicone.

6. The resealable Vacuum Valve of claim 1 is made of a single piece of pliable rubber.

7. A resealable vacuum valve for sealing a canning jar, comprising:
    an annular vacuum interface ring having an interior wall, a vacuum interface ring surface, and a valve interface bottom surface opposite the vacuum interface ring surface;
    a sealing membrane interior to the vacuum interface ring having a sealing membrane top surface and a sealing membrane bottom surface opposite the sealing membrane top surface;
    an anchor stem structurally attached to, essentially centered on, and extending from the sealing membrane bottom surface; and
    at least one air evacuation holes disposed through the sealing membrane interior to and equidistantly around the interior wall of the vacuum interface ring,
    wherein, the anchor stem of the resealable vacuum valve is extended through a hole disposed near the center of a canning jar lid placed onto a canning jar, a vacuum is applied to the resealable vacuum valve removing air from inside the canning jar through the air evacuation holes such that the vacuum seals the sealing membrane bottom surface to the canning jar lid while sealing the canning jar lid to the canning jar.

8. The resealable vacuum valve of claim 7, further comprising, the anchor stem having a valve retaining anchor at a distal end slightly larger in circumference than the anchor stem.

9. The resealable vacuum valve of claim 7 is made of a single piece of silicone.

10. The resealable vacuum valve of claim 7 is made of a single piece of pliable rubber.

* * * * *